US010930105B2

(12) United States Patent
Liu et al.

(10) Patent No.: US 10,930,105 B2
(45) Date of Patent: Feb. 23, 2021

(54) BANKNOTE MANAGEMENT METHOD AND SYSTEM

(71) Applicant: Julong Co., Ltd., Liaoning (CN)

(72) Inventors: Yongquan Liu, Liaoning (CN); Weisheng Liu, Liaoning (CN); Weizhong Sun, Liaoning (CN); Nannan Zhao, Liaoning (CN); Fuyan Wang, Liaoning (CN); Bin Jin, Liaoning (CN); Yunjiang Liu, Liaoning (CN); Bingfeng Lu, Liaoning (CN); Yanshen Cui, Liaoning (CN); Di Jin, Liaoning (CN); Rengang Jiao, Liaoning (CN); Lan Ge, Liaoning (CN)

(73) Assignee: Julong Co., Ltd., Liaoning (CN)

( * ) Notice: Subject to any disclaimer, the term of this patent is extended or adjusted under 35 U.S.C. 154(b) by 211 days.

(21) Appl. No.: 16/303,355

(22) PCT Filed: Dec. 26, 2016

(86) PCT No.: PCT/CN2016/112111

§ 371 (c)(1),
(2) Date: Nov. 20, 2018

(87) PCT Pub. No.: WO2017/197884

PCT Pub. Date: Nov. 23, 2017

(65) Prior Publication Data

US 2020/0320817 A1 Oct. 8, 2020

(30) Foreign Application Priority Data

May 20, 2016 (CN) ........................ 201610341020.4

(51) Int. Cl.
*G06K 9/00* (2006.01)
*G07D 7/20* (2016.01)
*G07D 7/206* (2016.01)

(52) U.S. Cl.
CPC .......... *G07D 7/2008* (2013.01); *G07D 7/206* (2017.05); *G07D 7/2016* (2013.01)

(58) Field of Classification Search
CPC .. G06Q 20/065; G06Q 40/04; G06Q 2220/00; G06Q 20/042; H04L 2209/38;
(Continued)

(56) References Cited

U.S. PATENT DOCUMENTS 6,970,236 B1 11/2005 Markantes et al.
8,371,429 B2 2/2013 Hamasaki
(Continued)

FOREIGN PATENT DOCUMENTS

CN 101536047 A 9/2009
CN 102136167 A 7/2011
(Continued)

OTHER PUBLICATIONS

Chinese Office Action dated Apr. 4, 2018 in connection with Chinese Application No. 201610341020.4.
(Continued)

*Primary Examiner* — Charlotte M Baker
(74) *Attorney, Agent, or Firm* — Amster, Rothstein & Ebenstein LLP

(57) ABSTRACT

Provided in the present invention is a banknote management method. The method comprises: acquiring, identifying, and processing banknote features by a banknote information processing apparatus, so as to obtain banknote feature information; transmitting the banknote feature information, service information, and information about the banknote information processing apparatus together to a main control server; and the main control server processing the received information and classifying banknotes. Also provided is a banknote management system for the banknote management method. The method of the present invention can enhance
(Continued)

robustness of identification while maintaining an operation speed, thus ensuring accuracy and practicability in actual applications.

24 Claims, 3 Drawing Sheets

(58) Field of Classification Search
CPC ........ H04L 2209/56; G06K 2017/0038; G07D 7/004; G07D 7/0047; G07D 7/12; G07D 7/2008; G07D 7/206; G07D 7/2016; G07D 7/202; G07D 11/28; G07D 7/00
USPC .................... 382/137; 705/35; 358/1.14, 1.15
See application file for complete search history.

(56) References Cited

U.S. PATENT DOCUMENTS

| | | | |
|---|---|---|---|
| 2006/0222230 A1 | 10/2006 | Ishikawa | |
| 2010/0125515 A1* | 5/2010 | Aso | G06Q 40/00 705/35 |

FOREIGN PATENT DOCUMENTS

| | | | |
|---|---|---|---|
| CN | 102142168 | A | 8/2011 |
| CN | 102509091 | A | 6/2012 |
| CN | 102800148 | A | 11/2012 |
| CN | 103518228 | A | 1/2014 |
| CN | 104866867 | A | 8/2015 |
| CN | 105261110 | A | 1/2016 |
| CN | 105303676 | A | 2/2016 |
| CN | 105335710 | A | 2/2016 |
| CN | 105354568 | A | 2/2016 |
| CN | 105957238 | A | 9/2016 |
| JP | H04291482 | A | 10/1992 |
| JP | 2002015317 | A | 1/2002 |
| JP | 2008310700 | A | 12/2008 |
| JP | 2009037621 | A | 2/2009 |
| JP | 2009193270 | A | 8/2009 |
| JP | 2009545807 | A | 12/2009 |
| JP | 2016031574 | A | 3/2016 |
| KR | 10-0472887 | B1 | 3/2005 |
| KR | 20130115367 | A | 10/2013 |
| RU | 2372662 | C2 | 11/2009 |
| RU | 2596591 | C2 | 9/2016 |
| RU | 2598987 | C1 | 10/2016 |
| WO | 2008056404 | A1 | 5/2008 |
| WO | 2012127741 | A1 | 9/2012 |
| WO | 2014064775 | A1 | 5/2014 |

OTHER PUBLICATIONS

Chinese Office Action dated Sep. 25, 2018 in connection with Chinese Application No. 201610341020.4.

Zhao J. "Applied Television Technology" pp. 272-273, 2013.

Mohsenzadeh Y et al., "Incremental relevance sample-feature machine: A fast marginal likelihood maximization approach for joint feature selection and classification," Pattern Recognition, 60, 2016, pp. 835-848.

Communication Supplementary European Search Report dated Dec. 16, 2019 in connection with European Patent Application No. 16902263.9.

Japanese Office Action dated Dec. 13, 2019 in connection with Japanese Patent Application No. 2019-513099.

Decision to Grant dated Apr. 10, 2019 in connection with Russian Application No. 2018145018.

First Office Action dated May 20, 2020 in connection with Korean Application No. KR20187037126.

Notice of Allowance dated Oct. 22, 2020 in connection with Korean Application No. KR 10-2018-7037126.

Indian Office Action dated Oct. 29, 2020 in connection with Indian Application No. 201837046501.

* cited by examiner

BANKNOTE MANAGEMENT METHOD AND SYSTEM

TECHNICAL FIELD

The present disclosure belongs to the field of finance, and particularly relates to a banknote management system and method thereof.

BACKGROUND

With the continuously improved application level of financial informatization, anti-counterfeiting of currency, service process management and financial security in a banking system are gradually inclining to intellectualization, and banknote management is of great significance for maintaining the security and stability of the national financial field and realizing RMB circulation trace management, counterfeit money management, ATM banknote configuration management, damaged banknote management and cash inflow and outflow management.

Banknote management is mainly directed to comprehensive processing of information such as banknote information and service information, the prefix numbers (serial numbers) in the banknote information play an increasingly important role in the banknote management, and banknote tracing and query can be greatly facilitated by associating the information of the prefix numbers with the information such as the service information. In this way, there is a higher requirement on the collection and identification of the prefix numbers and other information in the banknote management, especially the identification of the prefix numbers in a region to be identified, which requires not only high accuracy, but also high identification efficiency and identification speed.

In the related art, with the development of DSP technology, it is common to identify the prefix numbers through a DSP platform, with the help of computer vision technology and image processing technology. In a specific identification algorithm, the commonly used method includes template matching, BP neural network, support vector machine, etc., and multi-neural network fusion is also used in identification. For example, in the patent number CN201410285289, identification is realized by respectively designing and training two neural networks, i.e., a feature extraction network is trained through an image vector feature of the prefix number, and then combined with a BP neural network for identification, and the prefix number is identified through weight fusion to the two networks above. However, DSP identification method is often limited to the network transmission efficiency and the influences on the position and orientation of the banknotes in the DSP identification, and both the identification efficiency thereof and the robustness of the identification algorithm are relatively poor. For example, in the patent number CN201510726882, an edge is fitted through a grayscale threshold and direction search, and then an edge line is screened through the threshold to obtain a region slope. After identifying the orientation in combination with the neural network training, the prefix number is identified through line-by-line scanning and subsequent neural networks.

For another example, in the related art, such as the paper "Research and Implementation of RMB Clearing Method Based on Image Analysis", a convolutional neural network is used to identify the prefix number. However, the solution above only segments characters through the simplest binarization, which cannot effectively lasso the characters, and this will directly affect the data volume to be processed later and directly affect the practical value of the algorithm. Moreover, in the technical solution above, only simple size processing is adopted to the segmented characters, but the preprocessed and segmented images are not lassoed effectively and the image data is not effectively normalized. This simple size processing will bring heavy data processing volume to the subsequent neural network identification, which greatly reduces the subsequent identification efficiency. In addition, the influence of incomplete banknote on the banknote identification and image processing is not processed properly in the foregoing technical solution. Although the foregoing technical solution can achieve a certain identification accuracy theoretically, it cannot be well converted into a practical commercial method and cannot meet the speed requirement in real banknote identification due to the low operation and identification efficiency thereof.

It can be seen that the related art has the following problems: the orientation of the banknote and the effective positioning of characters cannot be efficiently solved, the character range of the related art after identification is large, which easily leads to wrong segmentation of characters, and the data volume for later image processing and identification is large, which reduces the identification efficiency; the rapid slope change of the banknote image caused by banknote delivery cannot be well adapted, and the slope of the banknotes cannot be corrected and identified in time; and the identification robustness of damaged banknotes is low, and no identifying and processing methods for damaged banknotes are provided accordingly.

SUMMARY

Therefore, the present disclosure provides a banknote management method and system capable of accurately collecting and identifying the banknote information with high efficiency, so as to solve a first technical problem that the banknote management system in the related art cannot accurately collect and identify the banknote information with high efficiency.

A second technical problem to be solved by the present disclosure is to propose a method for identifying a prefix number, which effectively solves the robustness problem of the identification algorithm under the conditions of damage, dirt, quick turnover and the like of an object to be identified when ensuring the identification efficiency of the prefix number.

A banknote management method according to the present disclosure includes the following steps of:

(1) collecting, identifying and processing, by a banknote information processing apparatus, a banknote feature to obtain banknote feature information;

(2) transmitting the banknote feature information in step 1), service information and information of the banknote information processing apparatus together to a master server; and (3) integrating, by the master server, the banknote feature information, the service information and the information of the banknote information processing apparatus received, and classifying banknotes.

Preferably, the banknote feature is collected by one or more of image, infrared, fluorescence, magnetism and thickness measuring in the step 1).

Preferably, the classifying the banknotes in the step 3) specifically includes: after classifying the banknotes, feeding the banknotes into different banknote warehouses according to the classified categories. The banknote warehouse is a container or space accommodating the banknotes.

Preferably, the banknote information includes one or more of a currency, a nominal value, an orientation, authenticity, a newness rate, defacement, and a prefix number; wherein, the orientation refers to forward and reverse orientation of the banknote.

Preferably, the service information includes one or more of record information of collection, payment, deposit or withdrawal, service time period information, operator information, transaction card number information, identity information of at least one of a handler and an agent, two-dimensional code information, and a package number.

Preferably, the identifying the banknote feature specifically includes the following steps of:

step a: extracting a grayscale image of a region where the banknote feature is located, and performing edge detection on the grayscale image, wherein the edge detection can be realized by conventional canny detection, sobel detection and other methods, and then combined with linear fitting to obtain an edge linear formula, but an empirical threshold for edge detection needs to be set experimentally to ensure the computing speed of the method;

step b: rotating the image, i.e., correcting and mapping coordinate points on the image of the banknote after the edge detection so as to straighten the image, thereby facilitating the segmentation and identification of the image of the number, wherein the rotating method can be implemented by using coordinate point transformation or correcting according to the detected edge formula to obtain a transformation formula, or by polar coordinate rotation, etc.;

step c: positioning single numbers in the image, which specifically includes: performing binarization processing on the image through adaptive binarization to obtain a binarized image; then projecting the binarized image, wherein conventional image projection is completed by only one vertical projection and one horizontal projection, a specific projection direction and number of times can be adjusted according to the specific identification environment and accuracy requirements, for example, projection with inclination angle direction can be used, or a plurality of multiple projections can be used; and finally segmenting the numbers by setting a moving window and using a manner of moving window registration to obtain an image of each number, wherein, the effect on the banknote with smudginess on the image of the prefix number and adhesion between characters is poor due to common problems such as banknote damage and smudginess, and particularly, adhesion among three or more characters is almost inseparable; therefore, after the image projection, the present disclosure adds the manner of moving window registration to accurately determine positions of the characters; the manner of moving window registration is to reduce the number region by setting a fixed window, such as a window template manner, to realize more accurate region positioning, and all sliding matching manners by setting a fixed window can be applied to the present application;

step d: performing lasso on characters contained in the image of each number, and performing normalization on the image of each number, preferably, the normalization including size normalization and brightness normalization; wherein, a lasso operation on the characters refers to positioning the characters which are segmented with approximate positions in detail again to further reduce the data volume to be processed for subsequent image identification, which greatly ensures the overall operating speed of the system; and step e: identifying the image of the normalized number using a neural network to obtain the banknote feature, preferably, the banknote feature being a prefix number.

Preferably, the edge detection in the step a further includes: setting a greyscale threshold, and performing linear search from upper and lower directions according to the threshold, to acquire edges, wherein a linear scanning manner is adopted in the edge detection to obtain a linear pixel coordinate of the edge; and obtaining an edge linear formula of the image through a least squares method, and obtaining a horizontal length, a vertical length and a slope of the banknote image meanwhile.

Preferably, the rotating in the step b further includes: obtaining a rotation matrix on the basis of the horizontal length, the vertical length and the slope, and getting a pixel coordinate after rotating according to the rotation matrix. The rotation matrix can be obtained by polar coordinate conversion, i.e., a polar coordinate conversion matrix, for example, an inclination angle of the banknote can be obtained by the edge linear formula obtained, and a polar coordinate conversion matrix of each pixel can be calculated according to the angle and a length of the edge; the conversion matrix can also be calculated by common coordinate conversion, such as setting a central point of the banknote as an origin of coordinates according to the inclination angle and the length of the edge, and calculating a conversion matrix of each coordinate point in a new coordinate system, etc.; of course, other matrix transformation methods can also be used to correct the rotation of the banknote image.

Preferably, the performing binarization processing on the image through adaptation binarization in the step c specifically includes:

obtaining a histogram of the image, setting a threshold Th, and when a sum of points of a greyscale value in the histogram from 0 to Th is greater than or equal to a preset value, using the Th at the moment as an adaptation binarization threshold to perform binarization on the image and obtain the binarized image.

Preferably, the projecting the binarized image includes three times of projection performed in different directions.

Preferably, the moving window registration in the step c specifically includes: designing a moving window for registration, the window moving horizontally on a vertical projection map, and a position corresponding to a minimum sum of blank points in the window being an optimum position for left-right direction segmentation of the prefix number.

Preferably, the window is a pulse train with a fixed interval, and a width between pulses is preset by the interval between the images of the prefix numbers.

Preferably, the width of each pulse is 2 to 10 pixels.

Preferably, the lasso in the step d specifically includes: separately performing binarization on the image of each number, performing region growing on the binarized image of each number acquired, and finally selecting one or two regions with an area greater than a certain preset area threshold from the regions obtained after the region growing, a rectangle where the selected region is located being a rectangle of the image of each number after lasso. A region growing algorithm, such as eight neighborhoods, can be used in the region growing.

Preferably, the separately performing binarization on the image of each number specifically includes: extracting a histogram of the image of each number, acquiring a binarization threshold by a histogram 2-mode method, and then performing binarization on the image of each number according to the binarization threshold.

Preferably, the size normalization in the step d is performed using a bilinear interpolation algorithm.

More preferably, the normalized size is one of the followings: 12*12, 14*14, 18*18, and 28*28 in pixels.

Preferably, the brightness normalization in the step d includes: acquiring a histogram of the image of each number, calculating an average foreground grayscale value and an average background grayscale value of the number, comparing a pixel greyscale value before the brightness normalization with the average foreground grayscale value and the average background grayscale value respectively, and setting the pixel greyscale value before the normalization as a corresponding specific greyscale value according to the comparison result.

Preferably, the method further includes an orientation judging step between the step b and the step c: determining a banknote size through the rotated image, and determining a nominal value according to the size; segmenting a target banknote image into n blocks, calculating an average brightness value in each block, comparing the average brightness value with a pre-stored template, judging the template as a corresponding orientation when a difference between the two values is minimum. The template can be preset by various ways, as long as it can be used as a comparison template through comparison of banknote images, such as brightness difference, color difference caused by different orientations, or other features that can be converted into brightness values, etc.

Preferably, the pre-stored template segments images of different orientations of banknotes of different nominal values into n blocks, and calculates an average brightness value in each block as a template.

Preferably, the method further includes a newness rate judging step between the step b and the step c: extracting an image with a preset number of dpi firstly, taking all regions of the image as feature regions of the histogram, scanning pixel points in the regions, placing the pixel points in an array, recording the histogram of each pixel point, counting a certain proportion brightest pixel points according to the histograms, and obtaining an average grayscale value of the brightest pixel points as a basis for judging the newness rate. The images with a preset number of dpi may be, for example, 25 dpi images, etc. The certain proportion may be adjusted according to specific needs, and may be, for example, 40%, 50%, or the like.

Preferably, the method further includes a damage identifying step between the step b and the step c: acquiring a transmitted image by respectively arranging a light source and a sensor on both sides of the banknote; and detecting the rotated transmitted image point by point, and when two pixel points adjacent to one point are both less than a preset threshold, judging that the point is a damaged point. The detection of the damaged point can be divided into broken corner damage, hole damage, etc.

Preferably, the method further includes a handwriting identifying step between the step b and the step c: in a fixed region, scanning pixel points in the region, placing the pixel points in an array, recording a histogram of each pixel point, counting a preset number of brightest pixel points according to the histograms, obtaining an average grayscale value, obtaining a threshold according to the average grayscale value, and determining pixel points with a greyscale value smaller than the threshold as handwriting points. The preset number may be, for example, 20, 30, etc., which is not to be understood as limiting the scope of protection here; various methods can be used to obtain the threshold according to the average grayscale value. The average grayscale value can be directly used as the threshold or used as a function of variables to solve the threshold.

Preferably, a convolutional neural network of secondary classification is used as the neural network in the step e; all numbers and letters related to the prefix number are classified by primary classification, and categories of partial categories in the primary classification are classified again by secondary classification. It should be noted here that a number of categories of the primary classification can be set according to the classification needs and setting habits, such as 10 categories, 23 categories, 38 categories, etc., but is not limited here, and similarly, the secondary classification refers to the secondary classification performed again for some categories that are prone to miscalculation, and have approximate features or low accuracy on the basis of the primary classification, so that the prefix numbers can be further distinguished and identified with a higher identification rate, while the specific number of input categories and the number of output categories of the secondary classification can be set in details according to the category settings of the primary classification as well as the classification needs and setting habits, and is not limited here.

Preferably, a network model structure of the convolutional neural network is sequentially set as follows:

input layer: only one image is used as visual input, and the image is a grayscale image of a single prefix number to be identified;

C1 layer: the layer is a convolutional layer formed by six feature maps;

S2 layer: the layer is a downsampling layer which performs subsampling on the images using image local correlation principle;

C3 layer: the layer is a convolutional layer which convolves the S2 layer using a preset convolution kernel, wherein each feature map in the C3 layer is connected to the S2 layer by incomplete connection;

S4 layer: the layer is a downsampling layer which performs subsampling on the images using image local correlation principle;

C5 layer: the C5 layer is simple tension of the S4 layer, becoming a one-dimensional vector; and the output number of networks is a classification number and forms a complete connection structure with the C5 layer.

Preferably, both the C1 layer and the C3 layer perform convolution using 3×3 convolution kernels.

Preferably, the banknote information processing apparatus is one or more of a banknote sorter, a banknote counter, and a banknote detector; and the information of the banknote information processing apparatus is one or more of a manufacturer, a device number, and a financial institution located.

Or, the banknote information processing apparatus is a self-service financial device; and the information of the banknote information processing apparatus is one or more of a banknote configuration record, a banknote case number, a manufacturer, a device number, and a financial institution located.

The banknote management method includes the steps of collecting, identifying and processing banknote information in corresponding services thereof, and transmitting the banknote information to a host of a banking outlet or a host of a cash center by a plurality of the banknote information processing apparatuses, and then transmitting the banknote information to a master server by the host of the banking outlet or the host of the cash center.

Moreover, the present disclosure further provides a banknote management system, wherein the banknote management system includes a banknote information processing terminal and a master server terminal;

the banknote information processing terminal includes a banknote conveying module, a detecting module, and an information processing module;

the banknote conveying module is configured to convey banknotes to the detecting module;

the detecting module collects and identifies banknote feature;

the information processing module processes the banknote feature collected and identified by the detecting module and output the banknote feature as banknote feature information, and transmit the banknote feature information; and the master server terminal is configured to receive the banknote feature information, service information and information of the banknote information processing terminal, process the three types of information received, and classify the banknotes.

The processing by the master server terminal on the information received specifically includes processing like summarization, storage, consolidation, query, tracking, export, etc.

The detecting module can also be applied to a system for identifying a prefix number of a DSP platform, and can be embedded or connected to a conventional banknote detector, banknote counter, ATM and other equipment on the market for use. Specifically, the detecting module includes an image preprocessing module, a processor module, and a CIS image sensor module;

the image preprocessing module further includes an edge detecting module and a rotating module;

the processor module further includes a number positioning module, a lasso module, a normalization module, and an identification module the number positioning module performs binarization processing on the image through adaptive binarization to obtain a binarized image; and then projects the binarized image; and finally segments the numbers by setting a moving window and using a manner of moving window registration to obtain an image of each number, and transmits the image of each number to the lasso module, wherein the manner of moving window registration is to reduce the number region by setting a fixed window, such as a window template manner, to realize more accurate region positioning, and all sliding matching manners by setting a fixed window can be applied to the present application.

The normalization module is configured to perform normalization on the image processed by the lasso module, preferably, the normalization including size normalization and brightness normalization.

Preferably, the number positioning module further includes a window module, the window module designs a moving window for registration according to an interval between the prefix numbers, and moves the window horizontally on a vertical projection map, and calculates a sum of blank points in the window; and the window module can also compare the sum of blank points in different windows.

Preferably, the lasso module separately performs binarization on the image of each number, performs region growing on the binarized image of each number acquired, and then finally selects one or two regions with an area greater than a certain preset area threshold from the regions obtained after the region growing, a rectangle where the selected region is located being a rectangle of the image of each number after lasso. A region growing algorithm, such as eight neighborhoods, can be used in the region growing.

Preferably, the separately performing binarization on the image of each number specifically includes: extracting a histogram of the image of each number, acquiring a binarization threshold by a histogram 2-mode method, and then performing binarization on the image of each number according to the binarization threshold.

Preferably, the detecting module further includes a compensation module configured to compensate an image acquired by the CIS image sensor module, the compensation module prestores collected brightness data in pure white or pure blank, and obtain a compensation factor with reference to a greyscale reference value of a pixel point that can be set; and stores the compensation factor to the processor module, and establishes a lookup table.

Preferably, the identification module identifies the prefix number using a trained neural network.

Preferably, a convolutional neural network of secondary classification is used as the neural network; all numbers and letters related to the prefix number are classified by primary classification, and categories of partial categories in the primary classification are classified again by secondary classification. It should be noted here that a number of categories of the primary classification can be set according to the classification needs and setting habits, such as 10 categories, 23 categories, 38 categories, etc., but is not limited here, and similarly, the secondary classification refers to the secondary classification performed again for some categories that are prone to miscalculation, and have approximate features or low accuracy on the basis of the primary classification, so that the prefix numbers can be further distinguished and identified with a higher identification rate, while the specific number of input categories and the number of output categories of the secondary classification can be set in details according to the category settings of the primary classification as well as the classification needs and setting habits, and is not limited here.

Preferably, a network model structure of the convolutional neural network is sequentially set as follows:

input layer: only one image is used as visual input, and the image is a grayscale image of a single prefix number to be identified;

C1 layer: the layer is a convolutional layer formed by six feature maps;

S2 layer: the layer is a downsampling layer which performs subsampling on the images using image local correlation principle;

C3 layer: the layer is a convolutional layer which convolves the S2 layer using a preset convolution kernel, wherein each feature map in the C3 layer is connected to the S2 layer by incomplete connection;

S4 layer: the layer is a downsampling layer which performs subsampling on the images using image local correlation principle;

C5 layer: the C5 layer is simple tension of the S4 layer, becoming a one-dimensional vector;

the output number of networks is a classification number and forms a complete connection structure with the C5 layer.

Preferably, both the C1 layer and the C3 layer perform convolution using 3×3 convolution kernels.

Preferably, the identification module further includes a neural network training module configured to train the neural network.

Preferably, a chip system such as an FPGA may be used as the processor module.

Preferably, the processor module further includes: an orientation judging module configured to judge an orientation of the banknote.

Preferably, the processor module further includes a newness rate judging module configured to judge a newness rate of the banknote.

Preferably, the processor module further includes a damage identifying module configured to identify a damaged position in the banknote. The damage includes broken corner, hole, etc.

Preferably, the processor module further includes a handwriting identification module configured to identify handwritings on the banknote.

Preferably, the classifying the banknotes by the master server terminal specifically includes: after classifying the banknotes, feeding the banknotes into different banknote warehouses according to the classified categories.

Preferably, the banknote feature information includes one or more of a currency, a nominal value, an orientation, authenticity, a newness rate, defacement, and a prefix number.

Preferably, the service information includes one or more of record information of collection, payment, deposit or withdrawal, service time period information, operator information, transaction card number information, identity information of at least one of a handler and an agent, two-dimensional code information, and a package number.

Preferably, the banknote information processing terminal is one of a banknote sorter, a banknote counter, a banknote detector, and a self-service financial device; and further preferably, the self-service financial device is one of an automated teller machine (ATM), a cash deposit machine, a cash recycling system (CRS), a self-service information kiosk, and a self-service payment machine.

The present disclosure further provides a banknote information processing terminal which is the banknote information processing terminal included in the foregoing banknote management system.

The foregoing technical solutions of the present disclosure have the following beneficial effects.

1. The banknote management method of the present disclosure can realize intelligent management of the prefix number. Through the method of the present disclosure, the banknote information tracing, worn and counterfeit banknote management, unified management of the prefix number, electronic logs of services, data statistics and analysis, equipment status monitoring, customer-questioned banknote management, banknote configuration management, remote management, and equipment asset management of bank sorting equipment can be finely managed, and "pre-monitoring, in-process tracking, and post-analysis" of equipment and services are realized, which not only greatly reduces the management and operation costs of the bank sorting equipment, but also promotes the excellent operation of sorters, banknote counters and other equipment.

2. The banknote management method of the present disclosure realizes the high-efficiency collection and identification of the banknote information while ensuring the accuracy of the identification information, especially in prefix number identification, which improves the robustness of the method under the condition of ensuring the overall method and the operating speed of the system, and can well cope with the identification difficulties on the prefix number identification caused by banknote defacement, mutilation and quick turnover in practical application.

3. The method provided by the present disclosure occupies less system resources, is faster than the conventional algorithm in the related art, and can be well combined with the ATM, banknote detector and other equipment.

DETAILED DESCRIPTION

Figure 1:
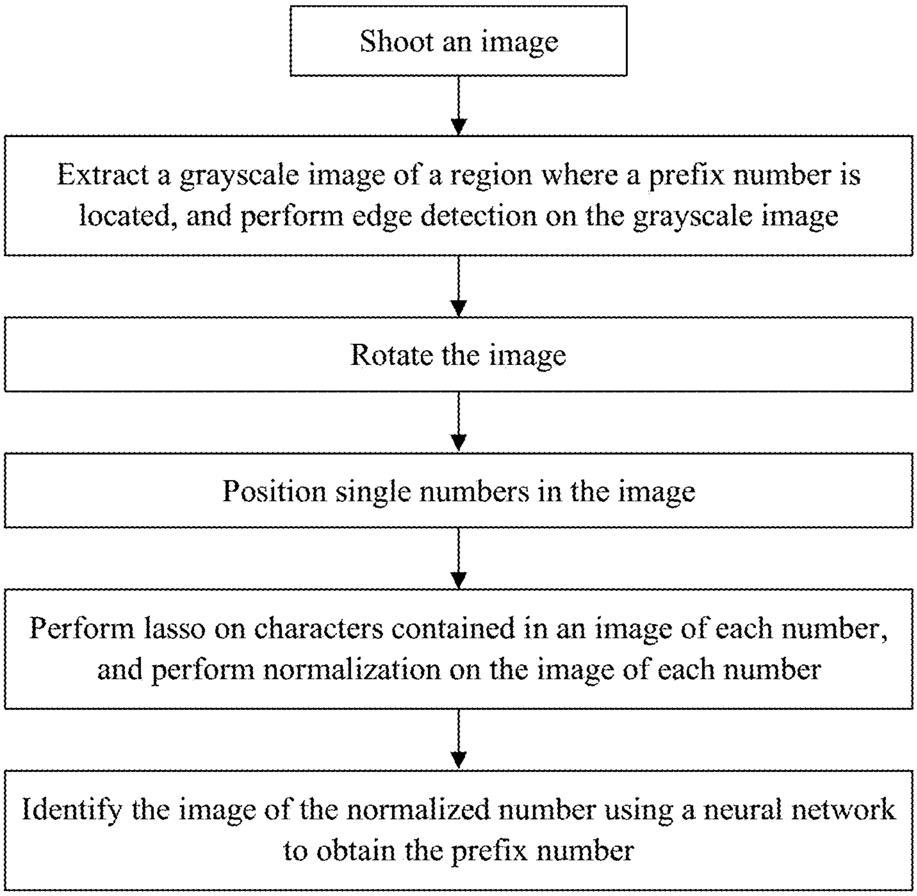
FIG. 1 is a schematic diagram of an identification method according to an embodiment of the present disclosure.

To make the technical problems to be solved, technical solutions, and advantages of the present invention clearer, the following detailed description will be made with reference to the drawings and specific embodiments. Those skilled in the art should know that the following specific embodiments or specific modes of execution are a series of optimized settings listed by the present invention to further explain the specific summary of the invention, and these settings can be used in combination with each other or in association with each other, unless it is explicitly proposed in the present invention that some or one specific embodiment or mode of execution cannot be set or used in association with other embodiments or modes of execution. At the same time, the following specific embodiments or modes of execution are only used as optimize settings, and are not to be understood as limiting the scope of protection of the present invention.

In addition, it should be understood by those skilled in the art that the specific values listed in the specific modes of execution and the embodiments for parameter setting are used as optional modes of execution for illustration purposes and should not be construed as limiting the scope of protection of the present invention. However, the algorithms involved and the settings of parameters thereof are only used for distance interpretation, and the formal transformation of the following parameters and the conventional mathematical derivation of the following algorithms should be regarded as falling within the scope of protection of the present invention.

First Embodiment

The embodiment provides a banknote management method, specifically including the following steps.

(1) Six banknote information processing apparatuses respectively collect, identify and process banknote features of banknotes in corresponding services thereof to obtain the banknote feature information, wherein, as a preferred implementation manner of the embodiment, the banknote information processing apparatus collects the banknote features by ways of image, infrared, fluorescence, magnetism and thickness. The banknote feature information includes a currency, a nominal value, an orientation, authenticity, a newness rate, defacement, and a prefix number. As a specific implementation manner of the embodiment, the banknote information processing apparatus is a banknote sorter; and the information of the banknote information processing apparatus is a manufacturer, a device number, and a financial institution located.

It should be noted that the number of the banknote information processing apparatus is not unique, which includes but is not limited to six, and is at least one.

As an alternative implementation manner of the embodiment, the banknote information processing apparatus may also be one or more of a banknote counter or a banknote detector; and the information of the banknote information processing apparatus may also omit one or more of the manufacturer, the device number, and the financial institution located.

As another alternative implementation manner of the embodiment, the banknote information processing apparatus may also be a self-service financial device; in particular, the banknote information processing apparatus may be any one of an automated teller machine, a cash deposit machine, a cash recycling system, a self-service information kiosk, and a self-service payment machine. The information of the banknote information processing apparatus may be one or more of a banknote configuration record, a banknote case number, a manufacturer, a device number, and a financial institution located.

(2) The banknote feature information in step (1) is transmitted to a host of a banking outlet, and then transmitted to a master server by the host of the banking outlet; moreover, the service information and the information of the banknote information processing apparatus are transmitted to the master server. As a preferred implementation manner of the embodiment, the service information includes record information of collection, payment, deposit or withdrawal, service time period information, operator information, transaction card number information, identity information of a handler and an agent, two-dimensional code information, and a package number.

It should be noted that the manner in which the banknote feature information is transmitted to the master server is not unique, and those skilled in the art can change transmission paths of the banknote feature information, the service information and the information of the banknote information processing apparatus according to the actual situations, for example, directly transmit the banknote feature information, the information of the banknote information processing apparatus and the service information in step (1) to the master server.

In addition, those skilled in the art may omit or replace some of the service information described in the embodiment according to actual needs, i.e., omit or replace one or more of the record information of collection, payment, deposit or withdrawal, the service time period information, the operator information, the transaction card number information, the identity information of the handler and the agent, the two-dimensional code information, and the package number.

(3) The master server integrates the banknote feature information, the service information and the information of the banknote information processing apparatus received, and classifies banknotes. As a preferred implementation manner of the embodiment, the classifying the banknotes specifically includes: after classifying the banknotes, feeding the banknotes into different banknote warehouses according to the classified categories.

As a preferred implementation manner of the embodiment, the following description will take a method of identifying a prefix number as an example to describe the method of identifying a banknote feature, which, as shown in FIG. 1, specifically includes the following steps.

In step a, a grayscale image of a region where a prefix number is located is extracted, and edge detection is performed on the grayscale image. The edge detection can be realized by conventional canny detection, sobel detection and other methods, and then combined with linear fitting to obtain an edge linear formula, but an empirical threshold for edge detection needs to be set experimentally to ensure the computing speed of the method.

In a specific mode of execution, the edge detection in the step a further includes: setting a greyscale threshold, and performing linear search from upper and lower directions according to the threshold, to acquire edges, wherein a linear scanning manner is adopted in the edge detection to obtain a linear pixel coordinate of the edge; and obtaining an edge linear formula of the image through a least squares method, and obtaining a horizontal length, a vertical length and a slope of the banknote image meanwhile.

Figure 2:
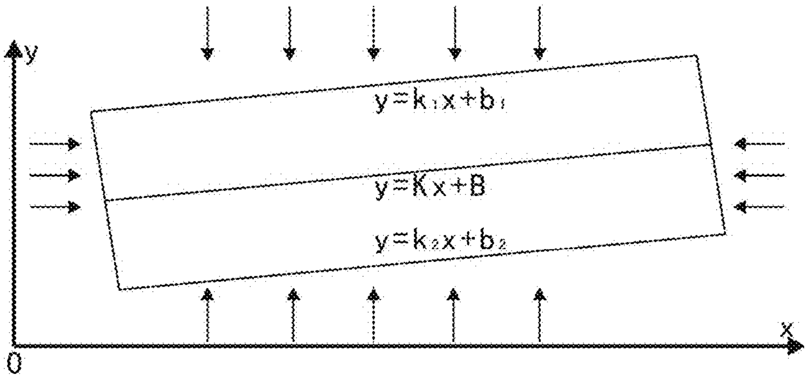
FIG. 2 is a schematic diagram of an edge detection method according to an embodiment of the present disclosure.

In a specific mode of execution, as shown in FIG. 2, a threshold linear regression segmentation technique can be used to ensure the accuracy of edge detection and the speed of calculation, which is fast and not limited by a size of the image. In other edge detection theories, it is necessary to calculate every pixel point of the edge. In this case, the larger the image is, the longer the calculation time will be. When using the threshold linear regression segmentation technique, only a small number of pixel points need to be found on the upper and lower edges, and an edge linear formula can be determined quickly by the way of linear fitting. The image can be calculated using a small number of points no matter the image is large or small.

Specifically, because the edge brightness of the banknote image is very different from a background black, it is very easy to find a threshold to distinguish the banknote from the background, so a linear search method is used here to detect the banknote edges from upper and lower directions. In the upper and lower directions, we search along a straight line $X=\{x_i\}$, $(1=1, 2, \ldots, n)$ to get an upper edge $Y_1=\{y_{1i}\}$ and a lower edge $Y_2=\{y_{2i}\}$ of the banknote.

Slopes k1, k2, and intercepts b1, b2 are obtained using a least squares method. A slope K, and an intercept B of a midline of the upper and lower edges are obtained. It is known that the midline will certainty pass through a midpoint $(x_0, y_0)$, following a straight line $y=K\cdot x+B$.

we can obtain the following relational expressions:

$$\begin{cases} k_1 \cdot x_i + b_1 = y_{1i} \\ k_2 \cdot x_i + b_2 = y_{2i} \end{cases} \tag{1-1}$$

A least squares method is used to obtain $k_1$ and $b_1$:

$$\begin{cases} \bar{x} = E(X) = \frac{1}{n} \cdot \sum_{i=1}^{n} x_i \\ \overline{y_1} = E(Y_1) = \frac{1}{n} \cdot \sum_{i=1}^{n} y_{1i} \end{cases} \tag{1-2}$$

$$\begin{cases} x_{1d} = \frac{1}{n} \cdot \sum_{i=1}^{n} |x_i - \bar{x}| \\ y_{1d} = \frac{1}{n} \cdot \sum_{i=1}^{n} |y_i - \bar{y}| \end{cases} \tag{1-3}$$

-continued $$\begin{cases} k_1 = \frac{y_{1d}}{x_{1d}} \\ b_1 = \bar{y} - k_1 \cdot \bar{x} \end{cases} \quad (1\text{-}4)$$

Similarly, we can calculate $k_2$ and $b_2$:

$$\begin{cases} k_2 = \frac{y_{2d}}{x_{2d}} \\ b_2 = \bar{y} - k_2 \cdot \bar{x} \end{cases} \quad (1\text{-}5)$$

Therefore, the midline y=K·x+B of the upper edge and the lower edge of the banknote:

$$\begin{cases} K = \frac{k_1 + k_2}{2} \\ B = \frac{b_1 + b_2}{2} \end{cases}$$

Since the midline y=K·x+B of the upper edge and the lower edge of the banknote will certainty pass through the midpoint ($x_0$, $y_0$) of the banknote, therefore, we search along the straight line y=K·x+B to obtain a left end point ($x_1$, $y_1$) and a right end point, and finally the midpoint of the banknote image can be obtained as follows:

$$\begin{cases} x_0 = \frac{x_l + x_r}{2} \\ y_0 = \frac{y_l + y_r}{2} \end{cases} \quad (1\text{-}6)$$

After getting the midpoint of the banknote, we need to find a horizontal length L and a vertical length W of the banknote, so that we a length-width model of the banknote can be established in next section.

$$W = E(Y_1) - E(Y_2) = \frac{1}{n}\sum_{i=1}^{n} y_{1i} - \frac{1}{n}\sum_{i=1}^{n} y_{2i} = \frac{1}{n}\sum_{i=1}^{n}(y_{1i} - y_{2i}) \quad (1\text{-}7)$$

Then we take Y={$y_i$}, (i=1, 2, . . . , m) near a straight line y=$y_0$ to perform linear search to obtain a left edge $X_1$={$x_{1i}$} and a right edge $X_2$={$x_{2i}$} of the banknote; therefore there are:

$$L = E(X_1) - E(X_2) = \frac{1}{m}\sum_{i=1}^{m} x_{1i} - \frac{1}{m}\sum_{i=1}^{m} x_{2i} = \frac{1}{m}\sum_{i=1}^{m}(x_{1i} - x_{2i}) \quad (1\text{-}8)$$

In step b, the image is rotated; i.e., coordinate points on the image of the banknote after the edge detection are corrected and mapped so as to straighten the image, thereby facilitating the segmentation and identification of the image of the number, wherein the rotating method can be implemented by using coordinate point transformation or correcting according to the detected edge formula to obtain a transformation formula, or by polar coordinate rotation, etc.

In a specific mode of execution, the rotating in the step b further includes: obtaining a rotation matrix on the basis of the horizontal length, the vertical length and the slope, and getting a pixel coordinate after rotating according to the rotation matrix. The rotation matrix can be obtained by polar coordinate conversion, i.e., a polar coordinate conversion matrix, for example, an inclination angle of the banknote can be obtained by the edge linear formula obtained, and a polar coordinate conversion matrix of each pixel can be calculated according to the angle and a length of the edge; the conversion matrix can also be calculated by common coordinate conversion, such as setting a central point of the banknote as an origin of coordinates according to the inclination angle and the length of the edge, and calculating a conversion matrix of each coordinate point in a new coordinate system, etc.; of course, other matrix transformation methods can also be used to correct the rotation of the banknote image.

Figure 3:
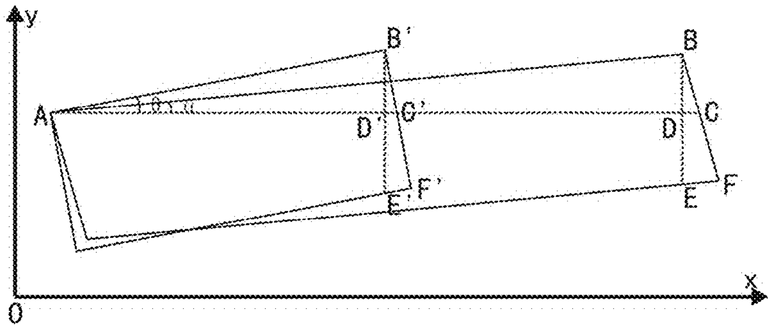
FIG. 3 is a schematic diagram of a banknote image and an actual banknote during banknote delivery according to an embodiment of the present disclosure.

In a specific mode of execution, as shown in FIG. 3, the image can be rotationally corrected by rectangular coordinate transformation. Since p points are acquired per millimeter in the horizontal direction and q points per millimeter in the vertical direction during image acquisition, we have calculated the horizontal length AC=L, the vertical length BE=W and the slope K of the banknote image in the previous edge detection on the banknote image, the following formulas are obtained from geometric calculation on the banknote image:

as $$AC' = \frac{L}{p} \quad (1\text{-}9)$$

therefore $$AD' = AC' \cdot \cos^2\theta = \frac{L \cdot \cos^2\theta}{p} \quad (1\text{-}10)$$

$$AD = p \cdot AD' = L \cdot \cos^2\theta \quad (1\text{-}11)$$

$$B'D' = AC' \cdot \cos\theta \cdot \sin\theta = \frac{L \cdot \cos\theta \cdot \sin\theta}{p} \quad (1\text{-}12)$$

$$BD = q \cdot B'D' = \frac{q \cdot L \cdot \cos\theta \cdot \sin\theta}{p} \quad (1\text{-}13)$$

while $$K = \tan\alpha = \frac{BD}{AD} = \frac{q}{p} \cdot \tan\theta \quad (1\text{-}14)$$

then $$\cos\theta = \frac{1}{\sqrt{1 + \left(\frac{p}{q} \cdot K\right)^2}} \quad (1\text{-}15)$$

$$\sin\theta = \frac{\frac{p}{q} \cdot K}{\sqrt{1 + \left(\frac{p}{q} \cdot K\right)^2}} \quad (1\text{-}16)$$

so that $$AB' = AC' \cdot \cos\theta = \frac{L \cdot \cos\theta}{p} = \frac{L}{p \cdot \sqrt{1 + \left(\frac{p}{q} \cdot K\right)^2}} \quad (1\text{-}17)$$

Similarly:

$$B'E' = \frac{w}{q} \quad (1\text{-}18)$$

so that $$B'F' = B'E' \cdot \cos\theta = \frac{Y}{q} \cdot \cos\theta = \frac{W}{q \cdot \sqrt{1 + \left(\frac{p}{q} \cdot K\right)^2}} \quad (1\text{-}19)$$

As AB 'AB' is the actual length Length of the banknote, and B'F' is the actual width Wide; therefore, there is $$\begin{bmatrix} \text{Length} \\ \text{Wide} \end{bmatrix} = \frac{1}{\sqrt{1 + \left(\frac{p}{q} \cdot K\right)^2}} \cdot \begin{bmatrix} \frac{1}{p} & 0 \\ 0 & \frac{1}{q} \end{bmatrix} \cdot \begin{bmatrix} L \\ W \end{bmatrix} \quad (1\text{-}20)$$

The whole rotating process of any point in the banknote image is to find a point $A'(x'_s, y'_s)$ corresponding to the actual banknote for any given point $A(x_s, y_s)$ in the banknote image, rotate the point A' by an angle of θ to obtain a point $B'(x'_d, y'_d)$, and finally find a point $B(x_d, y_d)$ on the rotated banknote image corresponding to the point B'.

Figure 4:
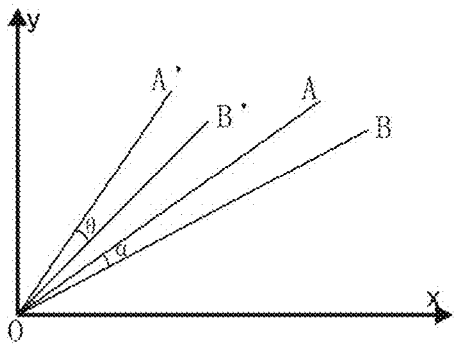
FIG. 4 is a schematic diagram illustrating rotating of any point of a banknote according to an embodiment of the present disclosure.

With reference to FIG. 4, when rotating any point on the banknote.

$$\begin{bmatrix} x'_s \\ y'_s \end{bmatrix} = \begin{bmatrix} \frac{1}{p} & 0 \\ 0 & \frac{1}{q} \end{bmatrix} \cdot \begin{bmatrix} x_s \\ y_s \end{bmatrix} \quad (1\text{-}21)$$

$$\begin{bmatrix} x'_d \\ y'_d \end{bmatrix} = \begin{bmatrix} \cos\theta & \sin\theta \\ -\sin\theta & \cos\theta \end{bmatrix} \cdot \begin{bmatrix} x'_s \\ y'_s \end{bmatrix} \quad (1\text{-}22)$$

$$\begin{bmatrix} x_d \\ y_d \end{bmatrix} = \begin{bmatrix} p & 0 \\ 0 & q \end{bmatrix} \cdot \begin{bmatrix} x'_d \\ y'_d \end{bmatrix} \quad (1\text{-}23)$$

$$\begin{bmatrix} x_d \\ y_d \end{bmatrix} = \begin{bmatrix} p & 0 \\ 0 & q \end{bmatrix} \cdot \begin{bmatrix} \cos\theta & \sin\theta \\ -\sin\theta & \cos\theta \end{bmatrix} \cdot \begin{bmatrix} \frac{1}{p} & 0 \\ 0 & \frac{1}{q} \end{bmatrix} \cdot \begin{bmatrix} x_s \\ y_s \end{bmatrix} \quad (1\text{-}24)$$

$$\begin{bmatrix} x_d \\ y_d \end{bmatrix} = \frac{1}{\sqrt{1 + \left(\frac{p}{q} \cdot K\right)^2}} \cdot \begin{bmatrix} 1 & \left(\frac{p}{q}\right)^2 \cdot K \\ -K & 1 \end{bmatrix} \cdot \begin{bmatrix} x_s \\ y_s \end{bmatrix} \quad (1\text{-}25)$$

If the center of the banknote image before rotation is $(x_0, y_0)$, and the center of the banknote image after rotation is $(x_c, y_c)$, then we can obtain:

$$\begin{bmatrix} x_d - x_c \\ y_d - y_c \end{bmatrix} = \frac{1}{\sqrt{1 + \left(\frac{p}{q} \cdot K\right)^2}} \cdot \begin{bmatrix} 1 & \left(\frac{p}{q}\right)^2 \cdot K \\ -K & 1 \end{bmatrix} \cdot \begin{bmatrix} x_s - x_0 \\ y_s - y_0 \end{bmatrix} \quad (1\text{-}26)$$

In step c, single numbers in the image are positioned, which specifically includes: performing binarization processing on the image through adaptive binarization to obtain a binarized image; then projecting the binarized image, wherein conventional image projection is completed by only one vertical projection and one horizontal projection, a specific projection direction and number of times can be adjusted according to the specific identification environment and accuracy requirements, for example, projection with inclination angle direction can be used, or a plurality of multiple projections can be used; and finally segmenting the numbers by setting a moving window and using a manner of moving window registration to obtain an image of each number, wherein, the effect on the banknote with smudginess on the image of the prefix number and adhesion between characters is poor due to common problems such as banknote damage and smudginess, and particularly, adhesion among three or more characters is almost inseparable; therefore, after the image projection, the present disclosure adds the manner of moving window registration to accurately determine positions of the characters.

In a specific mode of execution, the performing binarization processing on the image through adaptation binarization in the step c specifically includes:

obtaining a histogram of the image, setting a threshold Th, and when a sum of points of a greyscale value in the histogram from 0 to Th is greater than or equal to a preset value, using the Th at the moment as an adaptation binarization threshold to perform binarization on the image and obtain the binarized image. The projecting the binarized image includes three times of projection performed in different directions. Preferably, the setting the moving window specifically includes: the window moving horizontally on a vertical projection map, and a position corresponding to a minimum sum of blank points in the window being an optimum position for left-right direction segmentation of the prefix number.

In a specific mode of execution, an overall adaptation binarization method may be used for binarization of the image. First, a histogram of the image is obtained. a region with black brightness is a prefix number region, and a region with white brightness is a background region. A sum of points N of a greyscale value in the histogram from 0 to Th is found on the histogram. When N>=2200 (empirical value), the corresponding threshold Th is the adaptation binarization threshold. The biggest advantage of this method is that the calculation time is short, which can meet the real-time requirements of the rapid banknote counting of the sorter and has good self-adaptability.

In a specific mode of execution, the binarized image is projected, and the up, down, left and right positions of each number can be determined by combining three projections. Horizontal projection is carried out for the first time to determine a line where the number is located, vertical projection is carried out for the second time to determine the left and right positions of each number, and horizontal projection is carried out for each small map for the third time to determine the up and down positions of each number.

Figure 5:
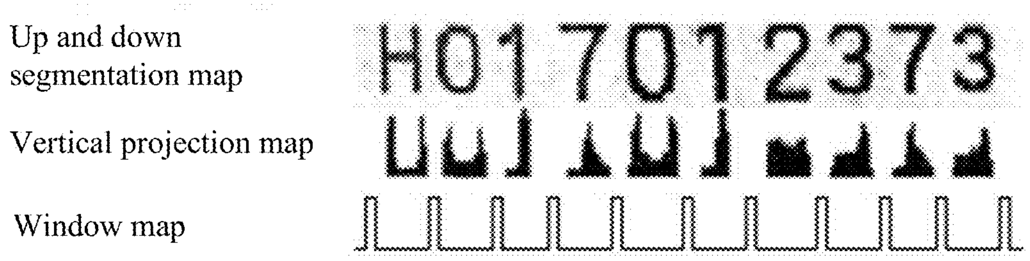
FIG. 5 is a schematic diagram of moving window setting according to the embodiments of the present disclosure.

In a specific mode of execution, the above-mentioned three projection methods can achieve excellent effects for single number segmentation of most banknotes, but have poor effects for banknotes with smudginess on the image of the prefix number and adhesion between characters, and particularly, adhesion among three or more characters is almost inseparable. In order to overcome this difficulty, window moving registration may be used in a specific mode of execution. Because the size and resolution of the prefix number collected by the sorter are fixed, the size of each character is fixed, and the interval between each character is also fixed, the window can be designed according to the interval of the prefix numbers on the banknote, as shown in FIG. 5. The window moves horizontally on a vertical projection map, and a position corresponding to a minimum sum of blank points in the window is an optimum position for left-right direction segmentation of the prefix number. Because the identification algorithm is used in the banknote sorter, both the accuracy and rapidity need to be satisfied, and the resolution of the original image is 200 dpi. A width of each pulse in the window design is 4 pixels, and a width between the pulses is designed according to the interval between the images of the numbers. Upon testing, this method can completely meet the real-time and accuracy requirements of the banknote sorter.

In step d, lasso is performed on characters contained in the image of each number, and normalization is performed on the image of each number, wherein the normalization includes size normalization and brightness normalization. A lasso operation on the characters refers to positioning the characters which are segmented with approximate positions in detail again to further reduce the data volume to be processed for subsequent image identification, which greatly ensures the overall operating speed of the system.

The three projection methods preliminarily position single numbers only, and cannot lasso multiple dirty single numbers. The above-mentioned binarization method binarizes the entire image, and the calculated threshold is not suitable for the binarization of single characters. For example, the first four characters are red and the last six characters are black in RMB 100 banknote of 2005 version, which will result in uneven brightness of each character in the grayscale image collected. In a specific mode of execution, each small map can also be binarized separately.

In a specific mode of execution, an adaptation binarization method based on histogram 2-mode method is used in the binarization. The histogram 2-mode method is an iteration method to find a threshold, which has the features of adaptation, quickness and accuracy. To be specific, one preferred mode of execution can be adopted to achieve the method.

First, an initialization threshold $T^0$ is set, and then a threshold of binary segmentation is obtained after K iterations. K is a positive integer greater than 0, and an average background grayscale value $g_b^{-k}$ and an average foreground grayscale value $g_f^{-k}$ of the $k^{th}$ iteration here are respectively:

$$g_b^{-k} = \frac{\sum_{i=min}^{T^{k-1}-1\Sigma} iHist(i)}{\sum_{i=min}^{T_{k-1}-1\Sigma} Hist(i)}$$

$$g_f^{-k} = \frac{\sum_{i=T^{k-1}+1}^{max\Sigma} iHist(i)}{\sum_{i=T^{k-1}+1}^{max\Sigma} Hist(i)}$$

Then, a threshold of the $k^{th}$ iteration is:

$T^k=(g_b^{-k}+_f^{-k})/2$

Conditions for exiting the iteration: exit the iteration when the iteration times are enough (for example, 50 times), or the threshold results calculated by two iterations are the same, i.e., the thresholds of the $k^{th}$ and $(k-1)^{th}$ iterations are the same.

After binarization, an eight-neighborhood region growing algorithm needs to be performed on each small map in order to remove noise points with too small area. Finally, one or two regions with an area greater than a certain region of an empirical value are selected from the regions obtained after the region growing performed on each small map, wherein a rectangle where the selected region is located is a rectangle of the image of each number after lasso. In conclusion, the lasso method includes the steps of binarization, region growing and region selection, and has the advantages of strong anti-interference and fast calculation speed.

After binarization, it is necessary to further perform normalization on the image. In a specific mode of execution, the normalization above may adopt a following manner: the normalization here is for next neural network identification. In view of the requirements of calculation speed and accuracy, the size of the image during size normalization cannot be too large or too small. Too large image results in too many subsequent neural network nodes and slow calculation speed, and too small map causes too much information loss. Several normalization sizes such as 28*28, 18*18, 14*14 and 12*12 are tested, and 14*14 is selected finally. A bilinear interpolation algorithm is used as a scaling algorithm of normalization.

In a specific mode of execution, the normalization in the step d further specifically includes: performing size normalization using a bilinear interpolation algorithm; the brightness normalization includes: acquiring a histogram of the image of each number, calculating an average foreground grayscale value and an average background grayscale value of the number, comparing a pixel greyscale value before the brightness normalization with the average foreground grayscale value and the average background grayscale value respectively, and setting the pixel greyscale value before the normalization as a corresponding specific greyscale value according to the comparison result.

In another specific mode of execution, brightness normalization is required to reduce training templates. Firstly, an average foreground grayscale value $G_b$ and an average background grayscale value $G_f$ of a number are calculated on the histogram of each small map. Set $V0_{ij}$ is a greyscale value of each pixel before the normalization, and $V1_{ij}$ is a greyscale value of each pixel after the normalization, then a calculating method is as follows:

$$V1_{ij} = \begin{cases} 0 & V0_{ij} > G_f \\ 255 & V0_{ij} < G_b \\ \dfrac{G_f - V0_{ij}}{G_f - G_b} & \text{Other} \end{cases}$$

In step e, the image of the normalized number is identified by a neural network to obtain the prefix number.

In a specific mode of execution, the foregoing neural network can be achieved using a convolutional neural network (CNN) algorithm.

The convolutional neural network (CNN) is essentially a kind of mapping from input to output, which can learn a mapping relationship between a large number of inputs and outputs without precise mathematical expressions between any input and output, and as long as the convolutional network is trained in a known pattern, the network has the ability to map between input and output pairs. In the CNN, a small part of the image (locally sensed region) is an input of a lowest layer of a hierarchical structure, and information is then transmitted to different layers in turn, and each layer obtains the most significant features of the observed data through a digital filter. The method can obtain the remarkable features of the observed data which is invariant in translation, scaling and rotation. The locally sensed region of the image allows neurons or processing units to access the most basic features, and the main features on the image of the prefix number are edges and corner points, so it is very suitable to use the CNN method for identification.

In a specific mode of execution, a convolutional neural network of secondary classification is used as the neural network. All numbers and letters related to the prefix number are classified by primary classification, and categories of partial categories in the primary classification are classified again by secondary classification. It should be noted here that a number of categories of the primary classification can be set according the classification needs. setting habits, such 10 categories, 23 categories, 38 categories, etc., but is not limited here, and similarly, the secondary classification refers. the secondary classification performed again for some categories that are prone to miscalculation, and have approximate features or low accuracy on the basis of the primary classification, so that the prefix numbers can be further distinguished and identified with a higher identification rate, while the specific number of input categories and the number of output categories of the secondary classification can be set in details according to the category settings of the primary classification well as the classification needs and setting habits.

In the following, the structure and training mode of a specific convolutional neural network (CNN) applicable to the technical solution of the present disclosure are illustrated with a preferred mode of execution.

I. Structure of CNN Neural Network

Because it is necessary to mixedly identify numbers and letters, while some numbers and letters are very similar and indistinguishable, the RMB does not have a letter V, and a letter 0 is printed exactly the same as a number 0, so we use a secondary classification method for identifying the prefix numbers. All the numbers and letters are classified into 23 categories by primary classification:

First category: A and 4
Second category: B and 8
Third category: C, G and Q
Fourth category: O, D and Q
Fifth category: E, L and F
Sixth category: H
Seventh category: K
Eighth category: M
Ninth category: N
Tenth category: P
Eleventh category: R
Twelfth category: S and 5
Thirteenth category: T and J (J is RMB of 2005 version and all versions)
Fourteenth category: U
Fifteenth category: W
Sixteenth category: X
Seventeenth category
Eighteenth category: Z and 2
Nineteenth category: 1
Twentieth category: 3
Twenty-first category: 7
Twenty-second category: 9
Twenty-third category: J (J is new version RMB of 2015).

The secondary classification refers to classification on A and 4, B and 8, C, 6 and G, 0, D and Q, E, L and F, S and 5, T and J, as well as Z and 2.

The above secondary CNN classification method relates to nine neural network models, which are respectively denoted as CNN_23, CNN_A4, CNN_B8, CNN_CG6, CNN_ODQ, CNN_ELF, CNN_S5, CNN_JT, and CNN_Z2.

Figure 6:
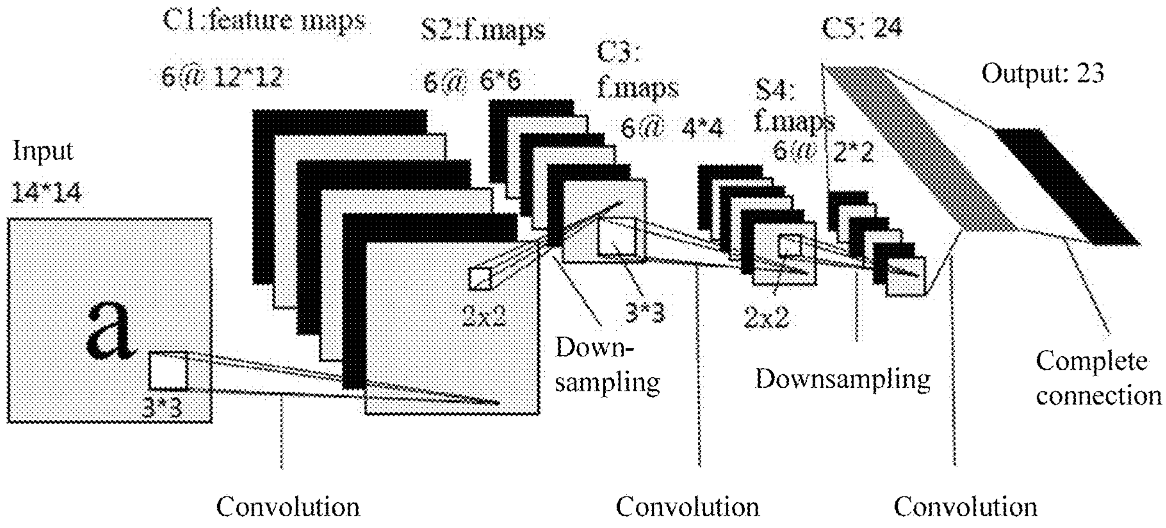
FIG. 6 is a structural schematic diagram of a neural network according to an embodiment of the present disclosure.

Taking the CNN neural network of primary classification for example, FIG. 6 is a structural schematic diagram of the CNN neural network. An input layer of the network has one map only, which is equivalent to visual input of the network, and is a grayscale image of a single number to be identified. The grayscale image is selected here for not losing information, because if the binarized image is identified, some edge and detail information of the image will be lost in the binarization process. In order to be not affected by the brightness effect of the image, normalization, i.e., brightness normalization, is performed on the brightness of each small grayscale map.

C1 layer is a convolutional layer, which has the advantages of enhancing original signal features and reducing noises by convolution operation, and consists of six Feature Maps. Each neuron in the feature map is connected to 3*3 neighborhoods in the input. The size of the feature map is 14*14. C1 has 156 trainable parameters (each filter has 5*5=25 unit parameters and one bias parameter, and there are a total of six filters with a total of (3*3+1)*6=60 parameters), and a total of 60*(12*12)=8640 connections.

Both S2 and S4 layers are downsampling layers which perform subsampling on the images using image local correlation principle, and can reserve useful information while reducing data processing volume.

C3 layer is also a convolutional layer. It also convolves the S2 layer through 3×3 convolution kernels, and then a feature map obtained has 4×4 neurons only. For simplicity of calculation, only six different convolution kernels are designed, so there are six feature maps. It should be noted here that each feature map in C3 is connected to S2 and is not completely connected. Why not connect each feature map in S2 to each feature map in C3? There are two reasons. The first reason is that an incomplete connection mechanism keeps connections in a reasonable scope. The second reason, which is also the most important reason is that it destroys the symmetry of the network. Because different feature maps have different inputs, they are forced to extract different features. The composition of this incomplete connection result is not unique. For example, the first two feature maps of C3 take three adjacent feature map subsets in S2 as inputs, the next two feature maps take four adjacent feature map subsets in S2 as inputs, the next one takes three non-adjacent feature map subsets as inputs, and the last one takes all feature maps in S2 as inputs.

The last group from S layer to C layer is not downsampling, but simple tension the S layer, becoming a one-dimensional vector. The output number of the network is the classification number of the neural network and forms a complete connection structure with the last layer. The CNN_23 here has 23 categories, so there are 23 outputs.

II. The Neural Network can be Trained Through the Following Manner.

Provided that a first layer is a convolutional layer, a $(1+1)^{th}$ layer is a downsampling layer, then a calculation formula of a $j^{th}$ feature map of the first layer is as follows:

$$x_j^l = f\left(\sum_{i \in M_j} x_i^{l-1} * k_{ij}^l + b_j^l\right)$$

where * sign indicates convolution, which means that a convolution kernel k performs convolution operation on all the associated features maps of a $(1\text{-}1)^{th}$ layer, then sums, adds an offset parameter b, and takes a sigmoid function $$f(x) = \frac{1}{1 + e^{-x}}$$

to obtain the final excitation.

A residual calculation formula of the $j^{th}$ feature map of the first layer is as follows:

$$\delta_j^l = \beta_j^{l+1}(f'(u_j^l).*up(\delta_j^{l+1}))$$

where, the first layer is the convolutional layer, the $(1+1)^{th}$ layer is the downsampling layer, and the downsampling layer is in one-to-one correspondence with the convolutional layer, where up(x) is to extend the size of the $(1+1)^{th}$ layer the same as that of the first layer.

A partial derivative formula of error to b is:

$$\frac{\partial E}{\partial b_j} = \sum_{u,v} (\delta_j^l)_{uv}$$

A partial derivative formula of error to k is:

$$\frac{\partial E}{\partial k_{ij}^l} = \sum_{u,v} (\delta_j^l)_{uv} (P_i^{l-1})_{uv}$$

About 100,000 RMB prefix numbers are randomly selected as training samples, wherein the training times are more than 1,000, and the approximation accuracy is less than 0.004.

In a specific mode of execution, the method further includes an orientation judging step between the step b and the step c: determining a banknote size through the rotated image, and determining a nominal value according to the size; and segmenting a target banknote image into n blocks, calculating an average brightness value in each block, comparing the average brightness value with a pre-stored template, judging the template as a corresponding orientation when a difference between the two values is minimum. The pre-stored template segments images of different orientations of banknotes of different nominal values into n blocks, and calculates an average brightness value in each block as a template.

Specifically, an orientation value of the banknote can be determined by banknote size detection+template matching. Firstly, a nominal value of the banknote is determined by the banknote size. Then, the orientation of the banknote is determined, 16*8 identical rectangular blocks are segmented inside the banknote image, and an average brightness value in each rectangular block is calculated, and the data of the 16*8 average brightness values are placed in a memory as template data. Similarly, an average brightness value of a target banknote is obtained, and compared with the template data to find the one with minimum difference. Then, the orientation of the banknote can be determined.

Moreover, in a specific mode of execution, a judgment on a newness rate of the banknote can be added. Firstly, an image of 25 dpi is extracted, all regions of the image of 25 dpi are taken as feature regions of the histogram, pixel points in the regions are scanned and placed in an array, the histogram of each pixel point is recorded, 50% brightest pixel points are counted according to the histograms, and an average grayscale value of the brightest pixel points is obtained and used as a basis for judging the newness rate.

In a specific mode of execution, the method further includes a damage identifying step between the step b and the step c: acquiring a transmitted image by respectively arranging a light source and a sensor on both sides of the banknote; detecting the rotated transmitted image point by point, and when two pixel points adjacent to one point are both less than a preset threshold, judging that the point is a damaged point.

In the specific embodiment, a transmittance manner of distributing a light-emitting source and a sensor on both sides of the banknote is adopted during banknote damage identifying. When the light-emitting source encounters the banknote, only a small part of the light can penetrate the banknote and hit the sensor, while the light that does not encounter the banknote completely hits the sensor. Therefore, the background is white and the banknote is also a grayscale map. The damage includes broken corners and holes. Both the broken corners and the holes are detected using a damage identifying technology. The difference is that the detection regions are different. Four corners of the banknote are detected for the broken corners, and a middle region of the banknote is detected for the holes.

In yet another specific mode of execution, for the broken corners of the banknote, the rotated and transmitted banknote image can be segmented into four regions, i.e., upper left, lower left, upper right and lower right. Then, the four regions are detected point by point. If two adjacent pixel points are both less than a threshold, then the point is judged as a damaged point. If the two adjacent points do not meet the condition of being less than the threshold, it indicates that a corner corresponding to the intersection point does not have a damaged feature.

For the hole detection on the banknote, after searching for the broken corners of the banknote, the broken corners are already filled with black. If the banknote has broken corner and hole features, then the pixel point is white. In the searching process of the banknote, a pixel value of the point determined as the broken corner is changed to a black pixel value, so that filling is realized. Therefore, the whole banknote is searched with the four sides of the banknote as boundaries. If it is found that the banknote has the damage feature, it indicates that the banknote has holes; otherwise, the banknote has no holes. When every pixel point smaller than the threshold is searched, the area of the hole will be increased by 1. The area of the hole will be finally obtained when the searching is ended.

In another specific mode of execution, a following manner can be used for handwriting detection: in a fixed region, scanning pixel points in the region, placing the pixel points in an array, recording a histogram of each pixel point, counting 20 brightest pixel points according to the histograms, obtaining an average grayscale value, obtaining a threshold according to the average grayscale value. The pixel point smaller than the threshold is judged as handwriting plus 1.

Second Embodiment

The embodiment provides a banknote management system, wherein the banknote management system includes a banknote information processing terminal and a master server terminal;

the banknote information processing terminal includes a banknote conveying module, a detecting module, and an information processing module;

the banknote conveying module is configured to convey banknotes to the detecting module;

the detecting module collects and identifies banknote feature;

the information processing module processes the banknote feature collected and identified by the detecting module and output the banknote feature as banknote feature information, and transmit the banknote feature information; and in the embodiment, as a specific implementation manner, the banknote feature information specifically includes a currency, a nominal value, an orientation, authenticity, a newness rate, defacement, and a prefix number;

the master server terminal is configured to receive the banknote feature information, service information and information of the banknote information processing terminal, process the three types of information received, and classify the banknotes. In the embodiment, as a preferred implementation manner, the classifying the banknotes by the master server terminal specifically includes: after classifying the banknotes, feeding the banknotes into different banknote warehouses according to the classified categories.

In the embodiment, as a specific implementation manner, the service information includes record information of collection, payment, deposit or withdrawal, service time period information, operator information, transaction card number information, identity information of a handler and an agent, two-dimensional code information, and a package number.

As a preferred implementation manner of the embodiment, the master server terminal processes the information received, specifically including the processing like summarization, storage, consolidation, query, tracking and export.

It should be noted that the banknote information processing terminal described in the embodiment can be used alone. In the embodiment, the banknote information processing terminal is a banknote sorter. As an alternative technical solution of the embodiment, the banknote information processing terminal may also be replaced by one of a banknote counter, a banknote detector, and a self-service financial device; wherein, the self-service financial device may be any one of an automated teller machine, a cash deposit machine, a cash recycling system (CRS), a self-service information kiosk, and a self-service payment machine.

It should be noted that the design manner of the detecting module is not unique. In the embodiment, a specific implementation manner is provided. The detecting module can also be applied to a system for identifying a prefix number of a DSP platform, and can be embedded or connected to a conventional banknote detector, banknote counter, ATM and other equipment on the market for use. Specifically, the detecting module includes an image preprocessing module, a processor module, and a CIS image sensor module;

the image preprocessing module further includes an edge detecting module and a rotating module;

the processor module further includes a number positioning module, a lasso module, a normalization module, and an identification module the number positioning module performs binarization processing on the image through adaptive binarization to obtain a binarized image;

then projects the binarized image; and finally segments the numbers by setting a moving window and using a manner of moving window registration to obtain an image of each number, and transmits the image of each number to the lasso module; and the normalization module is configured to perform normalization on the image processed by the lasso module. In the embodiment, the normalization includes size normalization and brightness normalization.

In a specific mode of execution, the number positioning module further includes a window module, the window module designs a moving window for registration according to an interval between the prefix numbers, and moves the window horizontally on a vertical projection map, and calculates a sum of blank points in the window; and the window module can also compare the sum of blank points in different windows. The method in the first embodiment can be used as the specific method of positioning.

In another specific mode of execution, the lasso module separately performs binarization on the image of each number, performs region growing on the binarized image of each number acquired, and then selects one or two regions with an area greater than a certain preset area threshold from the regions obtained after the region growing, a rectangle where the selected region is located being a rectangle of the image of each number after lasso. A region growing algorithm, such as eight neighborhoods, can be used in the region growing.

In a specific mode of execution, it is necessary to compensate the banknote image since the status of the newness rate and damage conditions of the banknotes are different in the conventional banknote image acquisition. Therefore, a compensation module may be set in the detecting module to compensate an image acquired by the CIS image sensor module; the compensation module prestores collected brightness data in pure white or pure blank, and obtain a compensation factor with reference to a greyscale reference value of a pixel point that can be set; and stores the compensation factor to the processor module, and establishes a lookup table.

Specifically, a piece of white paper is pressed on the CIS image sensor to collect bright level data and store the data in a CISVL[i] array, and collect dark level data and store the data in CISDK[i]. A compensation factor is obtained by a formula CVLMAX/(CISVL[i]−CISDK[i]), where CVLMAX is a greyscale reference value of a pixel point that can be set, and a greyscale value of the white paper is set as 200 and according to experience.

The compensation factor calculated by a DSP chip is transmitted to a random memory of an FPGA (processing module) to form a look-up table. After that, a FPGA chip multiplies the collected pixel point data by the compensation factor of a corresponding pixel point in the look-up table to directly obtain the compensated data, and then transmit the data to the DSP.

In a specific mode of execution, the identification module identifies the prefix number using a trained neural network.

In a specific mode of execution, a convolutional neural network of secondary classification is used as the neural network; All numbers and letters related to the prefix number are classified by primary classification, and categories of partial categories in the primary classification are classified again by secondary classification. It should be noted here that a number of categories of the primary classification can be set according the classification needs. setting habits, such 10 categories, 23 categories, 38 categories, etc., but is not limited here, and similarly, the secondary classification refers. the secondary classification performed again for some categories that are prone to miscalculation, and have approximate features or low accuracy on the basis of the primary classification, so that the prefix numbers can be further distinguished and identified with a higher identification rate, while the specific number of input categories and the number of output categories of the secondary classification can be set in details according to the category settings of the primary classification well as the classification needs and setting habits.

In a more specific mode of execution, a neural network structure in the first embodiment above can be used to achieve the structure of the convolutional neural network.

In a more specific mode of execution, the processor module above may further include at least one of the following modules: an orientation judging module configured to judge an orientation of the banknote; a newness rate judging module configured to judge a newness rate of the banknote; a damage identifying module configured to identify a damaged position in the banknote; and a handwriting identification module configured to identify handwritings on the banknote. The methods exemplified in the first embodiment can be adopted as the methods for implementing the functions of these modules.

In a specific mode of execution, a chip system such as FPGA (Capital Microelectronics M7 chip with a specific model of M7A12N5L144C7) may be used as the processor module. A main frequency of the chip is (125 M for FPGA and 333 M for ARM), resources occupied are 85% for logic, and 98% for EMB, and the identification time is 7 ms. The accuracy is over 99.6%.

Obviously, the above-mentioned embodiments are merely examples for clarity of illustration and are not intended to limit the modes of execution. It will be apparent to those of ordinary skills in the art that other changes or variations may be made on the basis of the above description. It is not necessary or possible to exhaust all the modes of execution here. Obvious changes or variations derived therefrom are still within the scope of protection of the present invention.

What is claimed is:

1. A banknote management method, comprising the following steps of:

receiving, by a master server, banknote feature information, service information, and information of a banknote information processing apparatus, the banknote feature information being obtained through collecting, identifying and processing a banknote feature by the banknote information processing apparatus; and integrating, by the master server, the banknote feature information, the service information and the information of the banknote information processing apparatus received, and classifying banknotes, wherein the identifying the banknote feature by the banknote information processing apparatus comprises:

extracting a grayscale image of a region where the banknote feature is located, and performing edge detection on the grayscale image;

rotating the image;

positioning single numbers in the image, performing binarization processing on the image through adaptive binarization to obtain a binarized image; then projecting the binarized image; and finally segmenting the numbers by setting a moving window and using a manner of moving window registration to obtain an image of each number;

performing lasso on characters contained in the image of each number, and performing normalization on the image of each number, the normalization comprising size normalization and brightness normalization; and identifying the image of the normalized number using a neural network to obtain the banknote feature, the banknote feature comprising a prefix number.

2. The banknote management method according to claim 1, wherein the banknote information processing apparatus comprises a self-service financial device; and the information of the banknote information processing apparatus comprises one or more of a banknote configuration record, a banknote case number, a manufacturer, a device number, and a financial institution located.

3. The banknote management method according to claim 1, wherein the edge detection comprises: setting a greyscale threshold, and performing linear search from upper and lower directions according to the threshold, to acquire edges; and obtaining an edge linear formula of the image through a least squares method, and obtaining a horizontal length, a vertical length and a slope of the banknote image meanwhile.

4. The banknote management method according to claim 3, wherein the rotating the image comprises: obtaining a rotation matrix on the basis of the horizontal length, the vertical length and the slope, and getting a pixel coordinate after rotating according to the rotation matrix.

5. The banknote management method according to claim 1, the performing binarization processing on the image through adaptation binarization comprises: obtaining a histogram of the image, setting a threshold Th, and when a sum of points of a greyscale value in the histogram from 0 to Th is greater than or equal to a preset value, using the Th at the moment as an adaptation binarization threshold to perform binarization on the image and obtain the binarized image.

6. The banknote management method according to claim 1, wherein the moving window registration comprises: designing a moving window for registration, the window moving horizontally on a vertical projection map, and a position corresponding to a minimum sum of blank points in the window being an optimum position for left-right direction segmentation of the prefix number.

7. The banknote management method according to claim 1, wherein the performing lasso on characters contained in the image of each number comprises: separately performing binarization on the image of each number, performing region growing on the binarized image of each number acquired, and then selecting one or two regions with an area greater than a certain preset area threshold from the regions obtained after the region growing, a rectangle where the selected region is located being a rectangle of the image of each number after lasso.

8. The banknote management method according to claim 7, wherein the separately performing binarization on the image of each number comprises: extracting a histogram of the image of each number, acquiring a binarization threshold by a histogram 2-mode method, and then performing binarization on the image of each number according to the binarization threshold.

9. The banknote management method according to claim 1, wherein the brightness normalization comprises: acquiring a histogram of the image of each number, calculating an average foreground grayscale value and an average background grayscale value of the number, comparing a pixel greyscale value before the brightness normalization with the average foreground grayscale value and the average background grayscale value respectively, and setting the pixel greyscale value before the normalization as a corresponding specific greyscale value according to the comparison result.

10. The banknote management method according to claim 1, between the rotating the image and the positioning single numbers in the image, further comprising any step of an orientation judging step, a newness rate judging step, a damage identifying step and a handwriting identifying step:

the orientation judging step comprising: determining a banknote size through the rotated image, and determining a nominal value according to the size; segmenting a target banknote image into n blocks, calculating an average brightness value in each block, comparing the average brightness value with a pre-stored template, judging the template as a corresponding orientation when a difference between the two values is minimum;

the newness rate judging step comprising: extracting an image with a preset number of dpi firstly, taking all regions of the image as feature regions of the histogram, scanning pixel points in the regions, placing the pixel points in an array, recording the histogram of each pixel point, counting a certain proportion brightest pixel points according to the histograms, and obtaining an average grayscale value of the brightest pixel points as a basis for judging the newness rate;

the damage identifying step comprising: acquiring a transmitted image by respectively arranging a light source and a sensor on both sides of the banknote; detecting the rotated transmitted image point by point, and when two pixel points adjacent to one point are both less than a preset threshold, judging that the pixel point is a damaged point;

the handwriting identifying step comprising: in a fixed region, scanning pixel points in the region, placing the pixel points in an array, recording a histogram of each pixel point, counting a preset number of brightest pixel points according to the histograms, obtaining an average grayscale value, obtaining a threshold according to the average grayscale value, and determining pixel points with a greyscale value smaller than the threshold as handwriting points.

11. The banknote management method according to claim 1, wherein a convolutional neural network of secondary classification is used as the neural network; all numbers and letters related to the prefix number are classified by primary classification, and categories of partial pixel categories in the primary classification are classified again by secondary classification.

12. The banknote management method according to claim 1, wherein the banknote feature is collected by one or more of image, infrared, fluorescence, magnetism and thickness measuring.

13. The banknote management method according to claim 1, wherein the classifying the banknotes comprises: feeding the banknotes into different banknote warehouses according to classified categories.

14. The banknote management method according to claim 1, wherein:

the banknote feature information comprises one or more of a currency, a nominal value, an orientation, authenticity, a newness rate, defacement, and a prefix number;

the service information comprises one or more of record information of collection, payment, deposit or withdrawal, service time period information, operator information, transaction card number information, identity information of at least one of a handler and an agent, two-dimensional code information, and a package number.

15. The banknote management method according to claim 1, wherein the banknote information processing apparatus comprises one or more of a banknote sorter, a banknote counter, and a banknote detector; and the information of the banknote information processing apparatus comprises one or more of a manufacturer, a device number, and a financial institution located.

16. The banknote management method according to claim 15, further comprising: collecting, identifying and processing banknote information in corresponding services, and transmitting the banknote information to a host of a banking outlet or a host of a cash center by a plurality of the banknote information processing apparatuses, and then transmitting the banknote information to the master server by the host of the banking outlet or the host of the cash center.

17. A banknote information processing terminal, comprising a banknote conveying module, a detecting module, and an information processing module;

wherein the banknote conveying module is configured to convey banknotes to the detecting module;

the detecting module collects and identifies banknote feature;

the information processing module processes the banknote feature collected and identified by the detecting module and output the banknote feature as banknote feature information, and transmit the banknote feature information to a master server terminal, the master server terminal being configured to receive the banknote feature information, service information and information of the banknote information processing terminal, process the banknote feature information, the service information and the information of the banknote information processing terminal as received, and classify the banknotes.

18. A banknote management system, wherein the banknote management system comprises a banknote information processing terminal and a master server terminal;

the banknote information processing terminal comprises a banknote conveying module, a detecting module, and an information processing module;

the banknote conveying module is configured to convey banknotes to the detecting module;

the detecting module collects and identifies banknote feature;

the information processing module processes the banknote feature collected and identified by the detecting module and output the banknote feature as banknote feature information, and transmit the banknote feature information; and the master server terminal is configured to receive the banknote feature information, service information and information of the banknote information processing terminal, process the banknote feature information, the service information and the information of the banknote information processing terminal as received, and classify the banknotes.

19. The banknote management system according to claim 18, wherein the detecting module comprises an image preprocessing module, a processor module, and a CIS image sensor module;

the image preprocessing module further comprises an edge detecting module and a rotating module;

the processor module further comprises a number positioning module, a lasso module, a normalization module, and an identification module;

the number positioning module performs binarization processing on the image through adaptive binarization to obtain a binarized image;

then projects the binarized image; and finally segments the numbers by setting a moving window and using a manner of moving window registration to obtain an image of each number, and transmits the image of each number to the lasso module; and the normalization module is configured to perform normalization on the image processed by the lasso module, preferably, the normalization comprising size normalization and brightness normalization.

20. The banknote management system according to claim 19, wherein the number positioning module further comprises a window module, the window module designs a moving window for registration according to an interval between the prefix numbers, and moves the window horizontally on a vertical projection map, and calculates a sum of blank points in the window; and the window module can also compare the sum of blank points in different windows.

21. The banknote management system according to claim 19, wherein the lasso module separately performs binarization on the image of each number, performs region growing on the binarized image of each number acquired, and then selects one or two regions with an area greater than a certain preset area threshold from the regions obtained after the region growing, a rectangle where the selected region is located being a rectangle of the image of each number after lasso.

22. The banknote management system according to claim 19, wherein the detecting module further comprises a compensation module configured to compensate an image acquired by the CIS image sensor module, the compensation module prestores collected brightness data in pure white or pure blank, and obtain a compensation factor with reference to a greyscale reference value of a pixel point that can be set; and stores the compensation factor to the processor module, and establishes a lookup table.

23. The banknote management system according to claim 18, wherein the classifying the banknotes by the master server terminal specifically comprises: after classifying the banknotes, feeding the banknotes into different banknote warehouses according to the classified categories.

24. The banknote management system according to claim 18, wherein the banknote feature information comprises one or more of a currency, a nominal value, an orientation, authenticity, a newness rate, defacement, and a prefix number;

and/or, the service information comprises one or more of record information of collection, payment, deposit or withdrawal, service time period information, operator information, transaction card number information, identity information of at least one of a handler and an agent, two-dimensional code information, and a package number;

and/or, the banknote information processing terminal comprises one of a banknote sorter, a banknote counter, a banknote detector, and a self-service financial device; and preferably, the self-service financial device comprises one of an automated teller machine, a cash deposit machine, a cash recycling system, a self-service information kiosk, and a self-service payment machine.

* * * * *